July 22, 1969

A. B. WELSH ET AL 3,456,546

COINCIDENCE CIRCUIT AND TEACHING MACHINE FOR KEYBOARD DEVICES
UTILIZING COINCIDENCE CIRCUIT AND METHOD OF OPERATION

Filed April 18, 1966

INVENTOR.
ALAN B. WELSH
BY LARRY W. MILLER

July 22, 1969  A. B. WELSH ET AL  3,456,546
COINCIDENCE CIRCUIT AND TEACHING MACHINE FOR KEYBOARD DEVICES
UTILIZING COINCIDENCE CIRCUIT AND METHOD OF OPERATION
Filed April 18, 1966  3 Sheets-Sheet 2
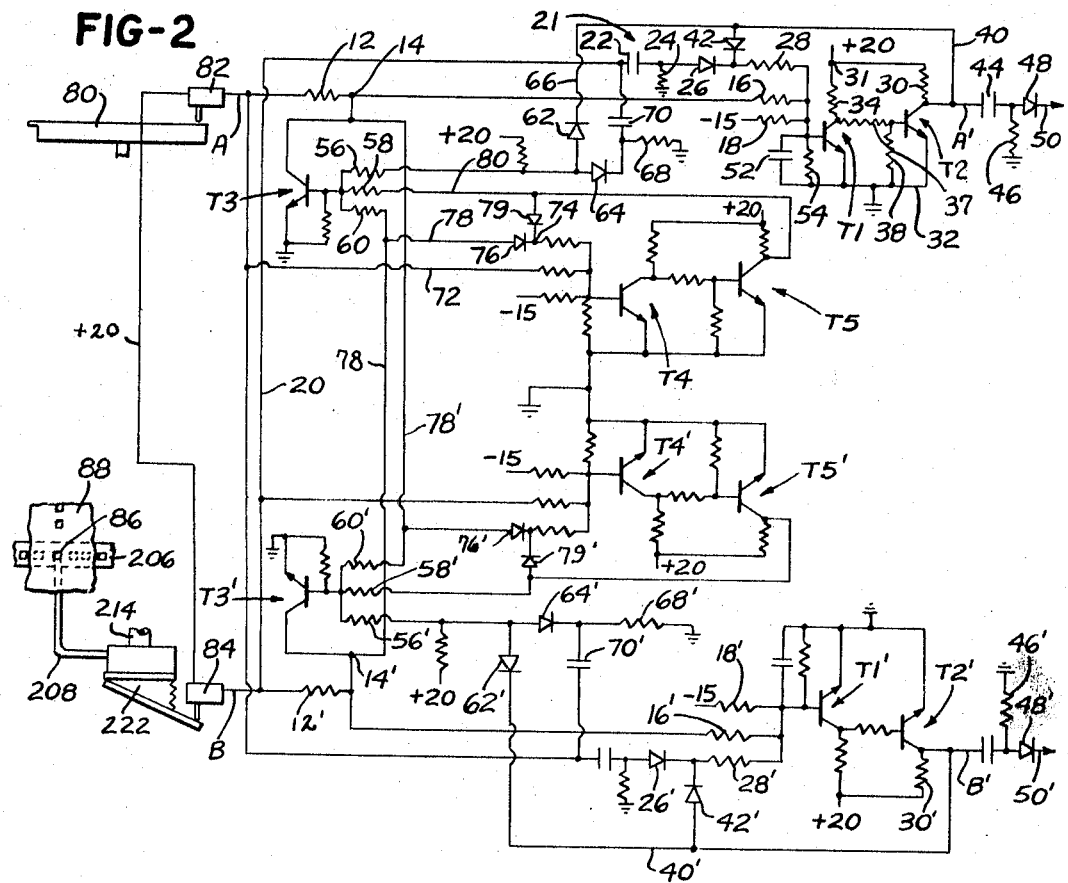
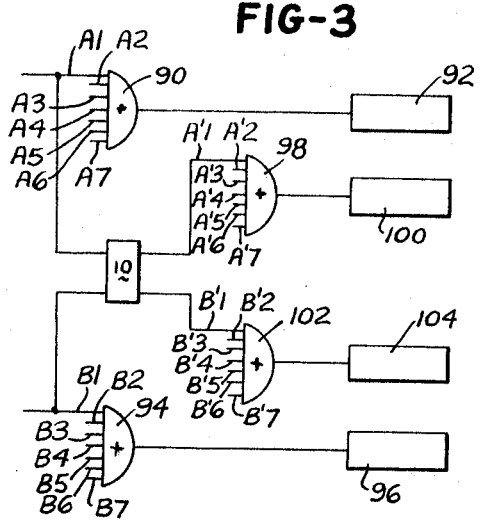
INVENTOR.
ALAN B. WELSH
LARRY W. MILLER
BY

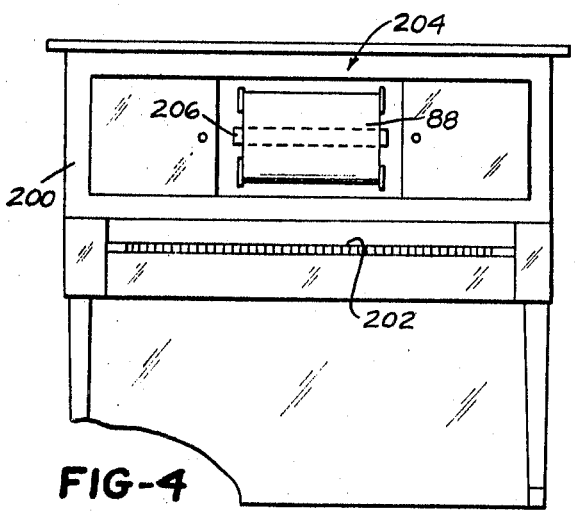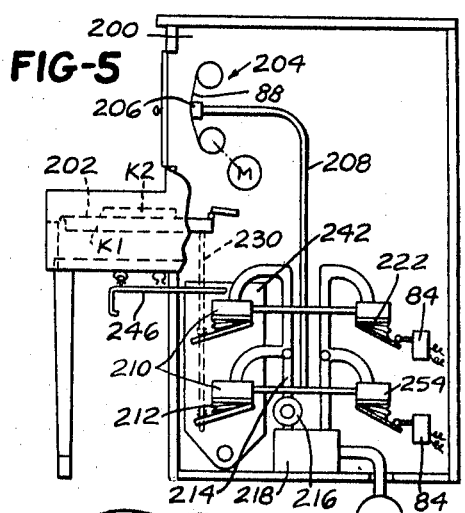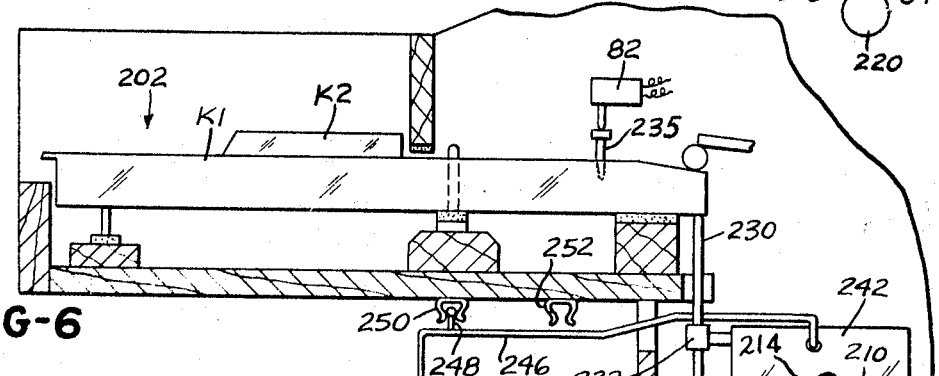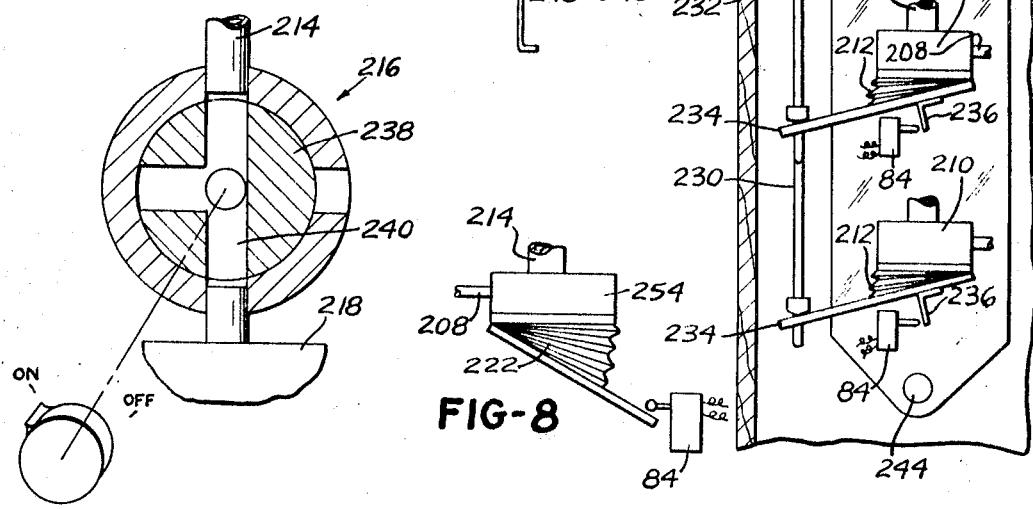

United States Patent Office 3,456,546
Patented July 22, 1969

3,456,546
COINCIDENCE CIRCUIT AND TEACHING MACHINE FOR KEYBOARD DEVICES UTILIZING COINCIDENCE CIRCUIT AND METHOD OF OPERATION
Alan B. Welsh, Jasper, Ind., and Larry William Miller, Chicago, Ill., assignors to Kimball Piano & Organ Co., Jasper, Ind., a corporation of Delaware
Filed Apr. 18, 1966, Ser. No. 543,120
Int. Cl. G09b 15/08
U.S. Cl. 84—478                                    23 Claims

ABSTRACT OF THE DISCLOSURE

Method and apparatus especially adapted for teaching the operation of keyboard devices and comprising a coincidence circuit with one input that receives programmed signals and another input which receives signals from the actuation of the keys of the keyboard device. The circuit compares the signals and provides an output signal for each condition of coincidence of the input signals whereby the quality of the performance of the keyboard operator can be determined by the number of output signals during a given period.

---

This invention relates to coincidence circuits and to particular uses thereof, especially in the field of instruction or conditioning as, for example, in connection with musical instrument instruction.

A coincidence circuit of the nature with which the present invention is concerned has at least two inputs and may have as many outputs as desired, from one up to the number of inputs. The inputs, in the case that there are two inputs, are connected to the outputs by circuitry of such a nature that an output pertaining to a given input will provide an output signal only when a first signal is supplied to the pertaining input, and thereafter, and during the pendency of the first signal, a signal is supplied to the other input terminal.

Furthermore, the circuitry provides that the output signal from the pertaining output terminal will occur only on the occasion of the first coincidence of signals at the input terminals during the period of the first signal so supplied to the input terminals.

A circuit of this nature has been found highly useful in connection with programmed instructions and conditioning, such as obtains in connection with instructing students in the playing of musical instruments, particularly keyboard instruments, such as pianos and organs.

In general, the circuitry is applied, in instructing in piano and organ, by providing the keys of the instrument with switches which are closed when the key is depressed. Each key operated switch is connected to supply an input terminal of a coincidence circuit of the nature referred to above.

The other terminal of each coincidence circuit is supplied with a signal from a switch corresponding to the key switch of the said one input terminal but under the control of a mechanical device, such as a player piano or player organ perforated playing roll or with an electrical signal from a source of programmed information, such as magnetic type, digitally coded tape, etc.

When the roll operated switches are operated by the movement of the roll simultaneously with the performance of a student on the keyboard of the same composition that is recorded on the roll, coincidence of signals from the key operated switches and the roll operated switches will produce output signals from the coincidence circuit. Lack of coincidence of the signals will of course, produce no output signals.

It is thus possible, by knowing the total number of signals supplied to the one input terminal by the roll operated switches, to grade the student on performance by counting the number of output signals from the coincidence circuit.

Furthermore, since an earlier signal from the roll operated switch will provide, on the occasion of a coincident signal from the pertaining key switch, an output signal at one output terminal, whereas a signal will be provided at the other output terminal when the key switch is the first to be operated, it is possible to determine the number of early responses, as well, thereby providing for a check on the quality of performance of the student even if the total number of coincidences scored was equal to the maximum.

As will be seen in the detailed description, delay means can be provided so that the key switch must be operated within a certain range of time from the instant of operation of the roll switch to obtain an output signal.

Other applications of the coincidence circuit to be described in detail hereinafter will occur to those skilled in the art and it is to be understood that the detailed disclosure of the circuitry in connection with a keyboard type musical instrument is merely exemplary and represents only one of many advantageous applications of the circuitry.

With the foregoing in mind, it will be apparent that the present invention has as a primary object the provision of a novel coincidence circuit which will provide a signal upon the occurrence, in a particular manner, of a condition of coincidence of a pair, or more, of input signals.

A particular object of the present invention is the provision of a coincidence circuit in which only one condition of coincidence will be signalled by an output signal during the existence of any given input signal.

A still further object of this invention is the provision of a coincidence circuit particularly adapted for use in connection with instructing and conditioning in the art of playing musical instruments and, in particular, keyboard type instruments.

Still another object of this invention is the provision of a musical instrument and in combination therewith coincidence circuit means operated in part by the musical instrument and in part by a mechanical device and including counter or register means receiving the output of the coincidence circuit means and providing a measure of the quality of the performance of the student.

Still another object of this invention is the provision of a system whereby multiple music students can be simultaneously graded as to their performance whereby a class average can be established.

Another object of this invention is the provision of a method of giving musical instruction, whereby an absolute standard is available by means of which the student can be graded.

Still another object of this invention is to provide a method of giving musical instructions, wherein more than one, up to several, students can be given instructions at one time, thereby substantially expanding the scope of operations of a musical instructor.

These and other objects and advantages of the invention will become more apparent on reference to the following specification taken in connection with the accompanying drawings in which:

FIGURE 2 is a more or less detailed schematic showing of the coincidence circuit as it is applied to a teaching or conditioning machine for key board operated devices;

FIGURE 3 is a schematic block diagram showing further features of the teaching machine incorporating a plurality of the coincidence circuits of FIGURE 2 and counters associated therewith;

FIGURE 4 is a schematic front elevational view of a key board operated instrument adapted for use in connection with the practice of the present invention and, more specifically, a player piano;

FIGURE 5 is a slide view of the player piano of FIGURE 4 partly broken away to show schematically the arrangement of some of the components within the piano;

FIGURE 6 is a sectional view drawn at enlarged scale showing more in detail two keys of the piano and the operating instrumentalities associated therewith;

FIGURE 7 is a sectional view showing a valve pertaining to the FIGURE 5 showing;

FIGURE 8 is a view drawn at somewhat enlarged scale showing somewhat more in detail a switch actuating pneumatic motor forming a part of the arrangement of FIGURE 5;

Figure 11:
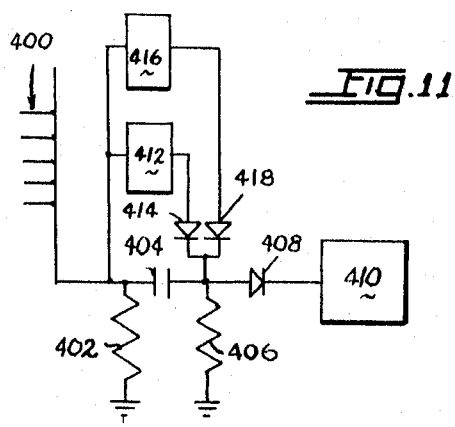
Figure 12:
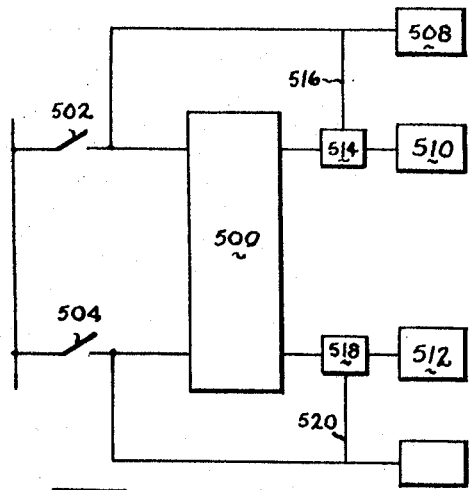

FIGURE 11 is a schematic view showing the manner in which the coincidence circuit could be combined in multiple and be so arranged as to operate a single counter with the circuit including components to distinguish between simultaneous impulses from the coincidence circuits so that the counter will register all of the impulses; and FIGURE 12 is a schematic showing of a modification that can be made in the coincidence circuit so that only those coincidences of inputs occurring within predetermined time intervals of each other will result in output pulses.

Figure 1:
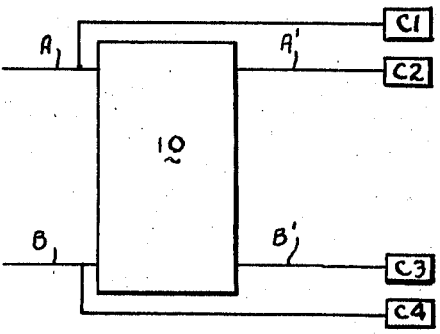
FIGURE 1 is a block diagram showing the principle of a coincidence circuit forming the basis of the present invention.

Referring more particularly to the drawings, FIGURE 1 shows in block diagram a simple coincidence circuit having two inputs and two outputs and counters connected to the imputs and outputs.

In FIGURE 1, the coincidence circuit is indicated at 10 and one input terminal is indicated at A and the other at B. The output terminal corresponding to imput terminal A is marked A', and the output terminal corresponding to input terminal B is marked B'. A first counter C1 is connected to input terminal A, a second counter C2 is connected to output terminal A', a third counter C3 is connected to output terminal B', and a fourth counter C4 is connected to input terminal B.

The circuitry of the coincidence circuit is such that upon the supplying of an electrical signal to input terminal A, counter C1 will register a count and the circuit will be prepared for the delivery of a signal from output terminal A'. If during the time that the signal is applied to input terminal A, there is a signal supplied to input terminal B, there will be a signal from output terminal A' but no signal from output terminal B'. Counter C2 connected to output terminal A' will register a count and a counter C4 connected to input terminal B will also register a count. During the pendency of the signal at input terminal A, only one instance of coincidence of a signal at input terminal B will produce a signal at output terminal A'.

When the initial input signal is supplied to input terminal B instead of input terminal A, the output terminal which supplied a signal is output terminal B'.

At this point it will be appreciated that the illustrated circuit is adapted for many industrial uses and the like and that it, furthermore, lends itself to use in connection with programmed instructions and conditioning, such as takes place when instructing students of musical instruments or non-musical keyed instruments. For example, the input terminal A may have the signal supplied thereto from a switch operated by a key or pitch recognition means of the musical instrument. Input terminal B has the signal supplied thereto from a switch under the control of a perforated player roll or some similar musical or coded recording, and the counters in FIGURE 1 can then be employed for grading the student's performance.

It will be appreciated that the total number of desired responses by the students will be indicated on counter C1. The total number of actual responses by the student will be indicated on counter C1. The total number of times that the students' response occurs during the interval that the roll operated switch is closed will be indicated by the sum of counters C2 and C3.

It will, furthermore, be appreciated that the count on counter C2 indicates those responses by the student in which the key switch was closed by the student in advance of the roll switch being operated by the player roll, while counter C3 indicates the number of times that the key switch operated by the student was closed after the roll operated switch was closed by the player roll.

By the introduction of suitable delay means in the coincidence circuit the output terminals A' and B' can be caused to supply output signals only when the operation of the key switch by the student occurs within a predetermined time interval preceding or following the operation of the roll switch by the player roll.

It will be appreciated that the coincidence circuit shown in block diagram in FIGURE 1 is arranged to be sensitive to two inputs only, namely, to the input from a single key switch and the input from a single roll operated switch. To adapt the circuitry to a plurality of inputs by multiple key switches and multiple roll operated switches requires extension of the circuitry, but the expanded circuit will be operated in the same general manner as described above.

FIGURE 2 shows more in detail a coincidence circuit of the nature referred to but including a number of refinements.

In FIGURE 2 the input terminals are again marked A and B and the pertaining output terminals are again marked A' and B', respectively. Input terminal A is connected through a resistor 12 to a junction point 14 and thence through another resistor 16 to the base of a transistor T1. An input signal to input terminal A is normally insufficient to open transistor T1 because of a negative bias of about 15 volts that is connected through resistor 18 to the base of the transistor.

Assuming, however, that a signal is supplied to input terminal A of, say, plus 20 volts, transistor T1 will remain closed but will open upon the supplying of a signal to input terminal B, as explained below.

Input terminal B is connected by wire 20 through a differentiator 21 consisting of condenser 22 and resistor 24 to the input side of a diode 26, the output side of which is connected through resistor 28 to the base of transistor T1. A signal to input terminal B, of, say, plus 20 volts, will, due to the aforementioned differentiator 21, cause a needle like pulse to be supplied to the base of transistor T1, whereupon this transistor will open.

The output terminal A' is connected to the collector of a transistor T2, the said collector also being connected through a resistor 30 to a plus 20 voltage supply at 31.

The emitter of transistor T2 is connected by wire 32 to ground and which wire also connects the emitter of transistor T1 to ground, thus, while transistor T1 was closed prior to the pulse of input terminal B, transistor T2 was open, connecting input terminal A' directly to ground and maintaining the voltage thereof at zero or "low."

The aforementioned plus 20 voltage supply 31 is connected through resistor 34 to the collector of transistor T1 and then through resistors 37 and 38 to ground wire 32. While transistor T1 is closed, or non-conductive, the bias on the base of transistor T2 retains it open, or conductive, to hold the output terminal A' low but, upon transistor T1 opening in response to the pulse from input terminal B, the bias changes on the base of transistor T2 causing it to close, whereupon output terminal A' goes "high," namely, to a voltage of approximately plus 20.

Since the pulse from the input terminal B was converted into a needle sharp momentary pulse by the differentiator, the "and" gate formed by transistors T1 and T2 will close immediately after being opened unless latched open. The latching open of the gate is accomplished by wire 40 which is connected from output terminal A' through diode 42 with the discharge side of diode 26. Diodes 26 and 42 thus form an OR gate. Whenever the gate is opened in the aforesaid manner, the signal fed back from output terminal A' to the base of transistor T1 will latch the gate open until the signal supplied from input terminal A via resistor 16 to the base of transistor T1 is terminated.

The signal at output terminal A' can be used as a signal which remain high as long as a high condition is present at junction 14, or it may be differentiated by means of condenser 44 and resistor 46 so as to supply a single needle pulse via diode 48 to wire 50 at about the instant the gate opens, namely when transistor T2 ceases to conduct through it collector emitter circuit.

A delay is built into the gate in the form of condenser 52 which bypasses resistor 54 which connected between the base of transistor T1 and ground. The delay arrangement referred to provides that the signal from input terminal B will be delayed a predetermined time with regard to the effect it has on transistor T1 for a purpose which will be more fully explained hereinafter.

Connected between junction point 14 and ground is a third transistor T3 in a normally non-conductive condition and operable, when made conductive, to connect junction point 14 to ground so that any signal rightwardly of junction 14 due to a signal at input A is grounded out. This transistor T3 is adapted for being opened or made conductive at a signal at any one of three terminals of an "OR" gate connected to the base thereof and which includes the resistors 56, 58, and 60.

Resistor 56 is connected to one side of an "AND" gate consisting of diodes 62 and 64, and also through a resistor to a plus 20 voltage supply.

The other side of diode 62 is connected by wire 66 with the ouput terminal A'.

The other side of the other diode 64 is connected to a differentiator consisting of a ersistor 68 and condenser 70 with input terminal B. Resistor 58 is connected with the output terminal of an AND gate similar to the one made up of transistors T1 and T2.

The last mentioned AND gate consisting of transistors T4 and T5 has a first input terminal 72 connected with input terminal A. The other input terminal at 74 is connected through a diode 76 with a wire 78 which is also connected with resistor 60 of the OR gate of transistor T3. Terminal 74 is connected through diode 79 with wire 80 which connects resistor 58 with the output side of the AND gate so that diode 79 forms a latch connection for the said AND gate.

The circuit components pertaining to input terminal B and output terminal B' are identical with those described above and carry the same numbers with the addition of a prime.

From the foregoing description it will be apparent that after an input signal is supplied to either input terminal, say, to input terminal A, a subsequent signal at the other input terminal B during the pendency of the first signal will open the AND gate associated with the output terminal A' pertaining to the first mentioned input terminal.

As has been explained, upon the opening of the AND gate pertaining to the said output terminal a differentiated and clipped pulse is delivered to the output wire leading therefrom, in the case mentioned, to wire 50.

No subsequent signal to input terminal B will produce a pulse at wire 50 as will now be explained.

When a signal was first supplied to input terminal A, a signal was conveyed via wire 78' to resistor 60' pertaining to transistor T3' which opened the transistor, thus grounding junction point 14' associated with input terminal B. The opening of transistor T3' prevents any signal from input terminal B to the AND gate pertaining to output terminal B' so that no signal can be developed at that output terminal.

Returning to the AND gate pertaining to output terminal A', upon opening of said gate a signal is conveyed therefrom via wire 66 to diode 62. The signal at input terminal B which opened the AND gate for output terminal A' is differentiated and supplied to diode 64 but the pulse width delivered by the differentiator consisting of condenser 70 and resistor 68 is so narrow that, upon the first signal at input terminal B, the said pulse has passed before the gate at terminal A' opens due to the delay action of condenser 52.

A subsequent signal delivered to input terminal B, however, will supply a pulse to diode 64 which, will of course, co-inside with a biased condition of diode 62 so that the AND gate made up of diodes 62 and 64 will provide a signal through resistor 56 to open transistor T3 and connect junction point 14 to ground.

The signal from input terminal A to the gate at output terminal A' is thereby interrupted and this gate will close while simultaneously the bias conveyed by wire 78' to transistor T3' will be reduced and transistor T3'' will close, thus, disconnecting junction point 14' from ground. Junction point 14' now assumes the voltage of the signal at input terminal B and this is conveyed by wire 78 to resistor 60 to hold transistor T3 in a conductive state.

If the signal at input A continues, it is conveyed to input terminal 72 of the AND gate, consisting of transistor T4 and T5.

When transistor T3' became non-conductive and the voltage increased on wire 78, a voltage was also delivered to input terminal 74. Voltage at both of the terminals 72 and 74 will open the AND gate consisting of transistors T4 and T5 and this will supply a voltage to resistor 58 which will also hold transistor T3 conductive. Under these conditions, the AND gate consisting of transistors T4 and T5 will remain open as long as the signal at the input terminal A continues. It is to be noted that the time constant of the gate consisting of transistors T4 and T5 is greater than the time required for the differentiated pulse supplied to diode 64 because of the time needed to remove storage charge at T5 and T5 is saturated.

The coincidence circuit described above is operated by having one of the input terminals connected to a playing key operated switch and the other of the terminals connected to a player roll operated switch when the coincidence circuit is adapted to a muscial instrument for instruction purposes.

In FIGURE 2 the key operated switch is represented at 82 and is under the control of a playing key 80 and is connected to input terminal A. Connected to input terminal B is a switch 84 under the control of aperture 86 in the player roll 88, as will be described hereinafter.

From the foregoing description, it will be apparent that there will be supplied to input terminal B, during the operation of the player roll, signals equal in number to the number of times the corresponding playing key is to be depressed during the same interval. If there is coincidence of actuation of switches 82 and 84, an output signal will be developed at one of output terminals A' and B', but only a single output signal can be developed during the pendency of a signal at either of the input terminals. Thus, the maximum number of output signals that can be obtained from the output terminals A' and B' is equal to the number of signals supplied to input terminal B. Furthermore, each output signal requires the actuation of both switches 82 and 84 after the last preceding output signal.

The described circuit is, thus, ideally adapted for monitoring the performance of a student and will give accurate information regarding the quality of the student's performance.

The coincidence circuit, as described so far, operates on the basis of two single inputs and two single outputs from the coincidence circuit. Any key operated musical instrument, however, has a plurality of keys and each key thereof must be monitored if an accurate representation of the players performance is to be obtained by the use of coincidence circuitry of the nature referred to above.

This can be done, according to the present invention, by providing a coincidence circuit of the nature described pertaining to each key to be monitored and connecting the outputs of the respective coincidence circuits through OR gates of the nature schematically illustrated in FIGURE 3.

In FIGURE 3, OR gate 90 has connected thereto terminals A1, A2, A3, A4, A5, A6, and A7 which represent the input terminals leading from the key switches to the several coincidence circuits pertaining thereto. It will be understood that as many terminals would be provided as there were keys to be monitored and that a showing of one of seven connections has been chosen arbitrarily. In response to the delivery of any signal to OR gate 90 at any of the input terminals thereof, a signal is supplied to counter 92 connected to the output terminal of the OR gate and a count is registered thereon.

Similarly, an OR gate 94 is provided to which are connected the terminals B1, B2, B3, B4, B5, B6, and B7 which are connected to the input terminals of the coincidence circuits that pertain to the player roll operated switches corresponding to the key operated switches which are connected to OR gate 90. The OR gate 94 has an output terminal connected to a counter 96 which will register a count in response to each signal delivered to OR gate 94.

A further OR gate 98 is provided to which are connected the output terminals A'1, A'2, A'3, A'4, A'5, A'6, and A'7 which represent the output terminals of the several coincidence circuits pertaining to the aforementioned input terminals A. The OR gate 98 has an output connected to a counter 100 which will register a count for each signal supplied to the input side of OR gate 98.

A still further OR gate 102 has input terminals to which are connected the several other output terminals of the coincidence circuits which are designated B'1, B'2, B'3, B'4, B'5, B'6, and B'7. The output side of OR gate 102 is connected to still another counter 104 which will register a count in response to each output signal of OR gate 102, and which, of course, will respond to an input signal to any one of the several input terminals thereof.

The circuit of FIGURE 3 represents schematically the manner in which the plurality of playing keys of an instrument can be monitored and compared with a plurality of player roll operated switches.

It will at once be apparent that the system according to FIGURE 3 could be extended by the use of further OR gates and the like so that a plurality of different instruments could be monitored at one time and a class average grade obtained. Furthermore, any monitoring device, could, by a simple switching device, be connected to any one instrument, or any group of instruments, and could be selectively shifted from one input to another as might be desired.

As to the incorporation of the system described in a musical instrument, reference may be had to FIGURES 4 through 8.

FIGURE 4 is a somewhat schematic front elevational view of a player type piano or organ. The musical instrument comprises the frame 200 having the conventional key board 202 and embodying a roll operated player mechanism generally designated 204. In FIGURE 5 it will be seen that the player mechanism comprises a tracker bar 206 of the conventional type over which the player roll 88 passes. The tracker bar is connected by tubes 208 with valves 210 pertaining to pneumatic key actuating motors 212. The valves control the supply of suction from a conduit 214 to the pneumatic key actuating motors. The conduit 214 leads to one side of a valve 216 the other side of which is connected to a source of suction, such as vacuum chest 218 which may be evacuated by a vacuum pump 220. The selector valve 216 is operable for selectively connecting conduit 214 to the vacuum chest 218 or for disconnecting it therefrom so that the key actuating pneumatic motors can be made selectively operative and inoperative.

The tubes 208 also lead to the control valves of pneumatic operators 222 pertaining to the switches 84. At this point it will be appreciated that each tube 208 comprises an individual tube leading from each aperture of the tracker bar to an individual valve pertaining to an individual key actuating pneumatic and to the control valve of a pneumatic for each individual one of the switches 84. Thus, there are as many of the tubes as there are playing keys to be controlled and there will be as many of the switches 84 as there are tubes and playing keys.

The arrangement of the keys and the motors therefor, and the key operated switches will be more clearly seen in FIGURE 6. In FIGURE 6 there is shown, by way of example, two keys K1 and K2. Each key near the rear end is abutted by an actuating rod 230 which extends downwardly through a pertaining guide collar 232 to the moveable portion 234 of the pertaining one of the pneumatic motors 212. As is known, in the player piano and player organ art, when the valve 210 pertaining to any one of the motors is operated by a signal from its pertaining tube 208, the valve opens to admit suction from conduit 214 to the pneumatic 212 and the pertaining key is operated by lifting of its actuating rod 230.

Associated with each key toward the rear end thereof is an abutment screw 235 operable to actuate a pertaining switch 82 which has been referred to as that switch which supplies a signal to terminal A of the pertaining coincidence circuit.

The roll operated switches 84 shown in FIGURE 5, and which supply signals to terminal B in FIGURE 2, could likewise be mounted as shown in FIGURE 6 on the frame carrying the key actuating pneumatic motors and the valves therefor. Each pneumatic motor could then be provided with a switch actuating element 236 which, upon movement of the pertaining motor, would actuate the said switch. The provision of individual pneumatics operators for the switches is contemplated and is shown in FIGURE 5 and the actuation of the switches by the pneumatic key operating motors is also contemplated and is shown in FIGURE 6.

The aforementioned selector valve 216 is shown in FIGURE 7 where it will be seen to comprise a rotor 238 having passage means 240 therein such that, in one position of the rotor, conduit 214 is directly connected to the vacuum chest 218 whereas, in another position of the rotor, conduit 214 is connected to the atmosphere so that all of the key actuating pneumatic become idle. The selector valve of FIGURE 7 would be employed in connection with the arrangement of FIGURE 5 wherein the roll operated switches have their own independent pneumatic operators so that the roll operated switches would operate even when the key actuating mechanism was rendered ineffective. The valves of the pneumatic actuators 222 for switches 84 in FIGURE 5 woud, of course, remain connected to vacuum chest 218 at all times.

When the switches under the control of the player roll are operated by the key actuating pneumatic motors, a somewhat different arrangement for rendering the key actuating motors ineffective is employed. This is illustrated in FIGURE 6 wherein the frame 242 which supports the key actuating pneumatic motors and the valves therefore is pivoted on a pivot rod 244 in the frame of the instrument. The frame is moveable into position where the rods 230 underlie the back end of the keys to be actuated and is also tiltable into such position that the rods will pass idly by the inner ends of the keys. The tilting of the frame 242 can easily be accomplished as by a pull bar 246 which has an element 248 thereon adapted for being snapped into one or the other of the retaining means 250 or 252. In either position of the frame, switches 84 will be actuated by the key pneumatic motor 212.

FIGURE 8 shows somewhat more in detail the switch actuating pneumatic motors 222 which are employed when the switches under the control of the player roll have their onw independent pneumatic motors. In FIGURE 8 the suction conduit 214 is connected to a valve 254 and to which valve a pertaining tube 208 leads. When the pressure in tube 208 changes due to the roll uncovering the pertaining hole in the tracker bar, valve 254 will admit suction from conduit 214 to motor 222 and the motor will operate the pertaining switch 84.

In using the arrangement according to the present invention in instruction and conditioning, a roll having the composition which the student is to learn or practice is placed in the roll playing mechanism and is run in the conventional manner. As is known, the running of the roll in the mechanism will cause the playing keys of the instrument to be depressed in the proper manner to play the recorded composition on the instrument. After the student has been exposed in this manner to the composition recorded on the roll, which may be done by playing the roll a number of times if so desired, the roll is rewound to its starting point. Portions of the recording can be rerun, if desired, to give more exposure to different passages.

The key playing portion of the playing mechanism is them rendered inoperative, either by intterrupting the supply of suction to the key pneumatics, or by tilting the actuating rods of the key actuating pneumatics out of effective position. Thereafter, when the roll is again run off by the playing mechanism there will be no actuation of the keys of the instrument. Instead, the student at this time operates the keys of the instrument and plays the recorded composition himself.

The operation of the roll by the roll mechanism will, as explained herein before, cause the roll switches to be closed and opened in conformity with the instants that the playing keys are supposed to be depressed and released by the student. At the same time, as the student depresses and releases the keys of the instrument the pertaining key operated switches 82 will be closed and opened. By connecting the key operated switches 82 and roll operated switches 84 to coincidence circuit means of the nature that has been previously described, the student's performance on the instrument can be directly compared with the normal performance as recorded on the player roll and a grade on the student's performance can immediately be arrived at.

It will be apparent that the system disclosed herein lends itself to gradual advancement of the student according to well established practices that are followed in connection with teaching machines. Thus, the student will be started with an extremely simple and probably short composition involving only a few keys of the piano or organ, or other key type instrument which he is studying. As the student acquires proficiency in the rendition of each composition another roll of a slightly more advanced composition will be subsituted for the preceding roll and, in this manner, the student will progress in a uniform manner. As has been experienced in connection with teaching machines, by regulating the advance of a student in this manner, extremely rapid overall advance can be made. It is therefore to be expected that by the use of a teaching and conditioning arrangement of the present invention, students can be brought to a highly advanced stage in the shortest possible time.

It is not to be presumed that the organization of the present invention is limited strictly to the instructing of novice students and the like but it is also possible to employ the device for conditioning advanced and highly accomplished performers by providing a recording, in the form of a perforated roll, of a composition in which the recording represents that degree of proficiency which the performer wishes to maintain in his own rendition of the composition. The scoring obtained from the device of the present invention will give an indication to the performer of the degree of deviation of his own rendition of the composition from that of the recording.

Figure 9:
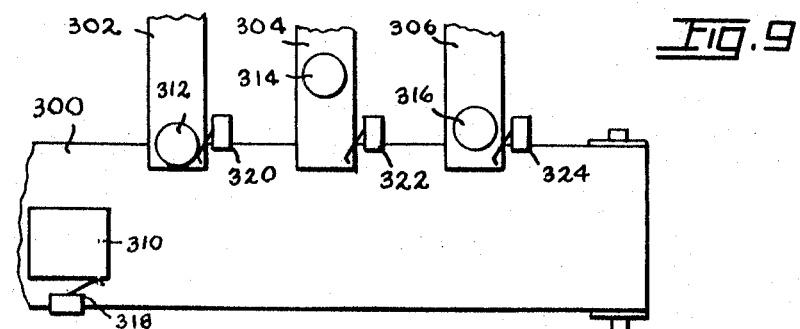
FIGURE 9 is a schematic representation of a work station wherein a plurality of parts are to be brought together simultaneously for assembly purposes or the like and the operation of which station is adapted for being placed under the control of coincidence circuit means according to the present invention.
Figure 10:
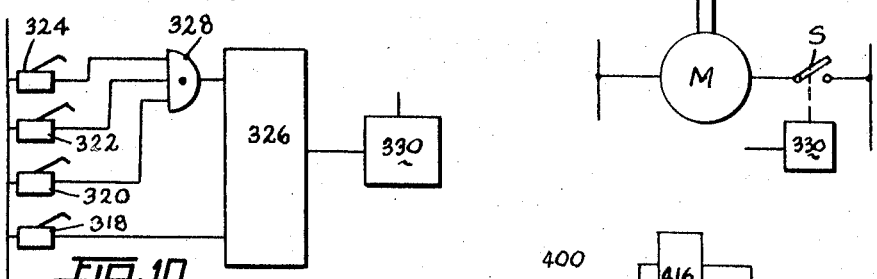
FIGURE 10 is a schematic illustration of the manner in which the coincidence circuit arrangement of the present invention could be incorporated in the control circuit of the work station of FIGURE 9.

With respect to further adaptation of the coincidence circuit according to the present invention, reference may be had to FIGURE 9 through 11.

In FIGURE 9 a work station is generally indicated which may comprise a main conveyor 300 and side conveyors 302, 304, and 306. Work pieces 310, 312, 314 and 316 are adapted to be delivered by the respective conveyors. The present invention provides an arrangement whereby the work pieces will be delivered only in complete groups to a predetermined working position. This is accomplished by having limit switches 318, 320, 322 and 324 associated with the paths of the several work pieces so as to be actuated thereby in response to movement of the respective work piece along its path. Each conveyor feeds its respective work piece through a position where the pertaining limit switch will be engaged and actuated. The respective conveyor will, however, continue its movement. If all of the limit switches are closed within a certain period the work station is permitted to continue in operation because all of the work pieces will be delivered substantially simultaneously to a predetermined working position.

As shown in FIGURE 10, the limit switches are connected so that switch 318 forms the signal to one input terminal of a coincidence circuit 326 whereas limit switches 320, 322, and 324 are effective for delivering a signal to the other input terminal of the circuit only through the AND gate 328 so that all of the last three switches must be closed at substantitally the same time to supply a signal to the pertaining input terminal of the coincidence circuit. The output of the coincidence circuit is delivered to a controller 330 connected in controlling relation to a switch S which controls motor M pertaining to the conveyor means leading to the work station. It will be understood that the foregoing example is merely a simplified representation of how the coincidence circuit of the present invention could be employed to monitor the movements of a plurality of individual elements at one time.

In FIGURE 3 a showing was made of how a plurality of terminal could be connected through OR gates to the input terminals of counters. In actual practice, in connection with the incorporation of the coincidence circuit means with a keyboard instrumentation such as the piano or organ, it has been found that the period of response of the coincidence circuit means and the counter connected thereto is such that only rarely does it occur that any two coincidence circuit means will supply impulses at exactly the same instant. Thus, normally, if the several coincidence circuits were connected directly to the input terminal of a counter, the counter would register all of the output pulses from the several coincidence circuits. However, the possibility does exist that two or more output pulses from separate coincidence circuits will occur at exactly the same instant and, with the connection of FIGURE 3, the connected counter would register only a single count.

FIGURE 11 shows a simple manner in which the circuit could be slightly modified so that the counter would count each and every pulse delivered thereto even though one or more pulses occurred simultaneously with another pulse.

In FIGURE 11 the output terminals from several coincidence circuits are indicated geenrally at 400. These terminals are connected to a summing resistor 402. A differentiator consisting of condenser 404 and resistor 406 connects the output terminals through a diode 408 with the input terminal of a counter 410. Normally, single pulses will pass through the differentiator and record single counts on the counter 410. If, however, two pulses are delivered simultaneously to summing resistor 402, the voltage developed across this resistor will be increased to the point that a delay gate 412 will be opened and a pulse will be supplied via a second diode 414 to the counter 410 and both of the pulses from the coincidence circuits making up the single pulse supplied to summing resistor 402 will thus be registered on counter 410. If it occurs that a third output pulse from the coincidence circuits coincides with two other pulses, the voltage across resistor 402 will be still higher and still another delay gate 416 with a greater delay period than gate 412 will open and a third pulse will be supplied by its diode 418 to the counter 410. It will be understood that the delay periods referred to are on the order of micro seconds and that the delay between the original pulse to resistor 402 and those from gates 412 and 416 need only be so much as is necessary to effect individual responses from counter 410.

Referring back now to the circuit of FIGURE 2, it will be evident that whenever an initial coincidence of closing of the switches in the input lines occurs, a signal will be developed at one of the output terminals of the coincidence circuit. It might be of importance however, particular for conditioning reasons or for instruction in the case of a highly advanced student, or for reasons of refinement in playing technique and the like, to provide that no output pulse will occur unless the coincidence of input signals occurs within a predetermined period after the colsing of the first one of the switches to be actuated.

A simple modification of the circuit of FIGURE 2 is shown in block diagram in FIGURE 12 wherein 500 represents a coincidence circuit such as is shown in FIGURE 2. 502 represents one input switch and 504 represents the other input switch. The counter connected to switch 502 is indicated at 508. The counter connected with the output terminal that supplies an output pulse when switch 502 is first closed is indicated at 510 and that counter which is connected to the output terminal which provided an output signal when switch 504 is the first one closed is indicated at 512.

Between the output terminal of the coincidence circuit and counter 510 there is provided a delay component 514. Component 514 is in the form of a gate, such as a transistor gate, which will remain open for a predetermined period of time following the supply of a signal to the control terminal thereof. The control terminal of 514 is connected by wire 516 to switch 502 so that upon closing of switch 502, gate 514 will open for a predetermined period of time only. Unless switch 504 is closed during that interval, no output pulse will be supplied to counter 510.

Similarly, a control gate of the same nature at 518 is connected between counter 512 and the pertaining output terminal of the coincidence circuit and the control terminal of gate 518 is connected by wire 520 with switch 504. The provision of this gate provides that, when switch 504 is the first closed of the switches no count will be registered on counter 512 unless the switch 502 is closed within a certain period of time after switch 504 is closed.

In the foregoing description, specific reference has been made to a perforated roll as the record member which carries the program of key actuation to be followed by the performer. It is to be understood, however, that other types of recordings could be employed. For example, magnetic tapes and other recording media could be employed with equal facility so long as a suitable detecting means was provided in association therewith dence circuits to compare with the input signals developed by the actuation of the keys.

The use of perforated player roll is of merit in instruction on musical instruments because it at one time presents the possibility of the performer first hearing the composition and then being graded on his own performance of the composition.

In industrial use of the coincidence circuit, for monitoring machines and process, where a teaching or demonstration step was not necessary, other recording media could be used to equal advantage.

It will be understood that this invention is susceptible to modification in order to adapt it to different usages and conditions; and accordingly, it is desired to comprehend such modifications within this invention.

What is claimed is:

1. In combination; a device having keys to be actuated to operate the device, a plurality of pairs of switches comprising a first switch associated with each of at least some of said keys and operated by the pertaining key when the key is actuated and a second switch pertaining to each said first switch, a recording of a predetermined sequence of operation of said keys, scanning means for scanning said recording, means operated by said scanning means for actuating said second switches according to the said recording, coincidence circuit means having respective input terminals connected to said switches to receive signals therefrom upon actuation of said switches, said coincidence circuit means having outmeans operable to develop a signal at said output terminal means upon a coincidence of actuation of the switches of a said pair of switches.

2. The combination according to claim 1 in which said device is a musical instrument and said recording is the recording of a musical composition.

3. The combination according to claim 1 in which said recording is a perforated strip and said scanning means is pneumatically operable.

4. The combination according to claim 1 in which said means embodied in said coincidence circuit means includes means responsive to the actuation of one of a pair of said switches to prepare a circuit to said output terminal means, and means responsive to the actuation of the other of said pair of switches while the said on thereof is actuated to complete the circuit to said output terminal means and thereby to develop said signal at said output terminal means.

5. The combination according to claim 4 in which said means embodied in said coincidence circuit means includes means for preventing the development of a signal at said output terminal means except upon the first occurrence of coincidence of actuation of the switches of each pair of switches during the pendency of a period of actuation of one of said switches.

6. A combination according to claim 5 which includes means for preventing the development of a signal at said output terminal means except when the first occurrence of coincidence of actuation of the switches of each pair of switches occurs within a predetermined time interval following the closing of the first of the said switches to be actuated.

7. The combination according to claim 1 in which there is a coincidence circuit for each said pair of switches, each coincidence circuit having an output terminal pertaining to each switch of the pertaining said pair of switches, means embodied in the coincidence operable upon the actuation of one of said switches for preparing a circuit to the pertaining output terminal while blocking off the other output terminal, and means operable upon the subsequent first actuation only of the other switch while said one switch is actuated for completing the circuit to the output terminal pertaining to said one switch to thereby develop said signal therein.

8. In combination according to claim 7 which includes minal of the first counter to said first switches, a second counter, an "OR" gate connecting the input terminal of the second counter to said second switches, a third counter, an "OR" gate connecting the input terminal of said third counter with the output terminals pertaining to said first switches, a fourth counter, and an "OR" gate connecting the input terminal of the fourth counter to the output terminals pertaining to said second switches.

9. The combination according to claim 1 in which there is a coincidence circuit for each said pair of switches, a source of potential and an AND gate between said source and each output terminal, each AND gate having two input terminals, and one of said input terminals of each AND gate being connected to the respective switch of the pertaining pair of switches, a differentiator connecting the other input terminal of each AND gate with the other switch of the pertaining pair of switches, and inhibiting means in the connection leading from each switch to its pertaining AND gate connected to be responsive to the actuation of the other switch so as to inhibit the signal from either switch to its pertaining AND gate after and while the other switch is actuated.

10. The combination according to claim 9 in which means is provided responsive to the actuation of one switch of a pair of switches a second time during the period of actuation of the other switch of the pair of switches for making the inhibiting means pertaining to said one switch ineffective while making the inhibiting means pertaning to said other switch effective.

11. In combination according to claim 1 wherein includes counter means connected to at least said output terminal means and to said second switches.

12. In combination; a musical instrument having playing keys, a pneumatic player mechanism for actuating said keys including means for scanning a perforated player roll, a pair of switches for each key including a first switch actuated by the pertaining key and a second switch, means operated by said player mechanism for actuating said keys and the said second switches pertaining thereto, selectively operable means to prevent actuation of said keys during operation of said player mechanism while permitting actuation of said second switches thereby, coincidence circuit means having respective main input terminal connected to said switches to receive signals therefrom upon actuation of said switches, said coincidence circuit means having output terminal means, and means embodied in said coincidence circuit means to develop a signal at said output terminal means upon a coincidence of actuation of the switches of a said pair of switches.

13. In combination; a musical instrument having playing keys, a pneumatic player mechanism for actuating said keys including means for scanning a perforated player roll, a pair of switches for each key including a first switch actuated by the pertaining key and a second switch, means operated by said player mechanism for actuating said keys and the said second switches pertaining thereto, selectively operable means to prevent actuation of said keys during operation of said player mechanism while permitting actuation of said second switches thereby, a coincidence circuit for each said pair of switches having a pair of output terminals, a source of potential, said circuit comprising an AND gate between said source and each output terminal, each AND gate having two input terminal means, one of said input terminal means of each AND gate being connected to the respective switch of the pertaining pair of switches, a differentiator connecting the other input terminal means of each AND gate with the other switch of the pertaining pair of switches, and inhibiting means in the connection leading from each switch to its pertaining AND gate connected to be responsive to the actuation of the other switch so as to inhibit the signal from either switch to its pertaining AND gate after and while the other switch is actuated.

14. The combination according to claim 13 in which means is provided responsive to the actuation of one switch of a pair of switches a second time during the period of actuation of the other switch of the pair of switches for making the inhibiting means pertaining to said one switch ineffective while making the inhibiting means pertaining to said other switch effective.

15. A coincidence circuit comprising a first main input terminal, a second main input terminal, output terminal means, means for supplying discrete chronologically spaced electrical signals individually to said first and second main input terminals respectively, means for developing an electrical signal at said output terminal means upon each first occurrence of coincidence of signals at said main input terminals during the pendency of the first to originate of said signals at said main input terminals, and means for preventing the development of an electrical signal at said output terminal means on any other occurrence of coincidence of signals at said main input terminals during the pendency of said first to originate of said signals at said main input terminals.

16. In combination according to claim 15 in which said output terminal means comprises an output terminal pertaining to each main input terminal, said means for developing a signal at said output terminals comprising a source of potential and a normally closed first AND gate connected between said source and each output terminal, each first AND gate having two input terminal means, a resistor connecting one input terminal means of each first gate with its pertaining main input terminal, a differentiator connecting the other input terminal means of each first gate with the other main input terminal, a normally ineffective inhibitor connected between each said resistor and the pertaining input terminal means of the pertaining first gate, each inhibitor having a control terminal connected to the gate side of the resistor pertaining to the other main input terminal and being operable in response to a signal supplied to said control terminal to inhibit the signal from said resistor to said first gate.

17. The combination according to claim 16 which includes a latching connection for each said AND gate in the form of a diode connected between the output terminal of each said first gate and the said other input terminal means thereof.

18. In combination according to claim 17 in which said first gate pertaining to each output terminal embodies a delay such that upon a first signal at one main input terminal during the pendency of a signal at the other input terminal, the pulse from the second differentiator connected to said one input terminal will have passed before said first gate at the output terminal pertaining to said other main input terminal opens.

19. In combination according to claim 18 in which a differentiator is connected to each output terminal so as to deliver a single pulse when the gates pertaining to the respective output terminals open.

20. The combination according to claim 16 which includes a second two input AND gate having its output side connected in controlling relation to the control terminal of each inhibitor, each second AND gate having one input connected to the main input terminal pertaining to the respective inhibitor, and a diode connecting the other input of each said second AND gate with the resistor pertaining to the other main input terminal on the side of the said resistor toward the pertaining said first gate.

21. The combination according to claim 20 in which a third two input AND gate is provided for each inhibitor, each third gate having its output side connected in controlling relation to the control terminal of the pertaining inhibitor, means connecting one input terminal of each said third AND gate to the output terminal means pertaining to the inhibitor pertaining to the respective said third AND gate, and a second differentiator connected between the other input terminal of each said third gate and the main input terminal pertaining to the other inhibitor.

22. The combination according to claim 21 in which the pulse from said second differentiator has passed before a signal is developed at the output side of the said first gate pertaining thereto.

23. The combination according to claim 20 which includes a latching connection for each said second gate in the form of a diode connected between the output terminal of the respective said second gate and the said other input terminal thereof.

References Cited

UNITED STATES PATENTS

| | | | |
|---|---|---|---|
| 2,223,009 | 11/1940 | Rupp | 84—478 |
| 3,185,865 | 5/1965 | Larey | 307—218 |

RICHARD B. WILKINSON, Primary Examiner

JOHN F. GONZALES, Assistant Examiner

U.S. Cl. X.R.

307—217; 328—94